United States Patent
Huang

(10) Patent No.: US 8,248,783 B2
(45) Date of Patent: Aug. 21, 2012

(54) HEAT DISSIPATION SYSTEM

(75) Inventor: Guo-He Huang, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 237 days.

(21) Appl. No.: 12/631,612

(22) Filed: Dec. 4, 2009

(65) Prior Publication Data

US 2011/0073276 A1    Mar. 31, 2011

(30) Foreign Application Priority Data

Sep. 29, 2009   (CN) .................. 2009 2 0311762 U

(51) Int. Cl.
   *H05K 7/20* (2006.01)
(52) U.S. Cl. ............... 361/679.5; 361/679.51; 361/695; 454/184; 174/16.3; 165/104.33
(58) Field of Classification Search ........ 361/679.46–679.51, 688–710
   See application file for complete search history.

(56) References Cited

U.S. PATENT DOCUMENTS

| | | | | |
|---|---|---|---|---|
| 5,793,608 A | * | 8/1998 | Winick et al. | 361/695 |
| 5,860,291 A | * | 1/1999 | Johnson et al. | 62/259.2 |
| 5,963,424 A | * | 10/1999 | Hileman et al. | 361/695 |
| 6,113,485 A | * | 9/2000 | Marquis et al. | 454/184 |
| 6,504,718 B2 | * | 1/2003 | Wu | 361/695 |
| 6,704,196 B1 | * | 3/2004 | Rodriguez et al. | 361/679.33 |
| 6,822,863 B1 | * | 11/2004 | Artman et al. | 361/695 |
| 6,970,353 B2 | * | 11/2005 | Brovald et al. | 361/679.5 |
| 6,975,509 B2 | * | 12/2005 | Osborn et al. | 361/679.47 |
| 7,028,753 B2 | * | 4/2006 | Sterner | 165/80.3 |
| 7,403,387 B2 | * | 7/2008 | Pav et al. | 361/694 |
| 2004/0196629 A1 | * | 10/2004 | Broder et al. | 361/695 |
| 2005/0041392 A1 | * | 2/2005 | Chen | 361/695 |
| 2007/0133167 A1 | * | 6/2007 | Wagner et al. | 361/687 |
| 2007/0201205 A1 | * | 8/2007 | Holmes et al. | 361/695 |
| 2007/0235168 A1 | * | 10/2007 | Chen et al. | 165/124 |
| 2011/0130891 A1 | * | 6/2011 | Nielsen et al. | 700/300 |

* cited by examiner

*Primary Examiner* — Courtney Smith
(74) *Attorney, Agent, or Firm* — Altis Law Group, Inc.

(57) ABSTRACT

A heat dissipation system includes a computer case has a base plate and a back plate perpendicularly to the base plate, a heat sink, a first fan and an air duct. The heat sink is positioned in the computer case in contact with a first heat source. The first heat source and the back plate define a first air channel therebetween. The first fan is positioned in the computer case adjacent to a first side of the heat sink. The first fan is configured to generate airflow through the heat sink in such a manner that airflow flows from the computer case outside is sucked into the computer case via the first air inlet and the first air channel. The air duct is positioned in the computer case adjacent to a second side of the heat sink. The heat sink heats the airflow from the first fan. The warm airflow heated by the heat sink is then blown out of the computer case by the first fan via the air duct.

6 Claims, 3 Drawing Sheets

HEAT DISSIPATION SYSTEM

BACKGROUND

1. Technical Field

The present disclosure relates to a heat dissipation system.

2. Description of Related Art

Electronic components, such as central processing units (CPUs), generate heat during normal operation, which can deteriorate their operational stability, and damage associated electronic components. Thus, the heat must be removed quickly to ensure normal operation of the CPU. A typical heat dissipation system includes a CPU fan and a system fan in a computer case. A heat sink is mounted on the CPU to remove heat, and the CPU fan is fixed on the heat sink to generate airflow through the heat sink. The airflow passes through the heat sink and is temperature increased by the heat generated by the CPU. The heated airflow is then taken out of the computer case by the system fan. The heated airflow is tends to be reflected by other components and causes interference in the computer case, which has an influence on other components' heat dissipating and is not efficient.

BRIEF DESCRIPTION OF THE DRAWINGS

Many aspects of the embodiments can be better understood with references to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

Figure 1:
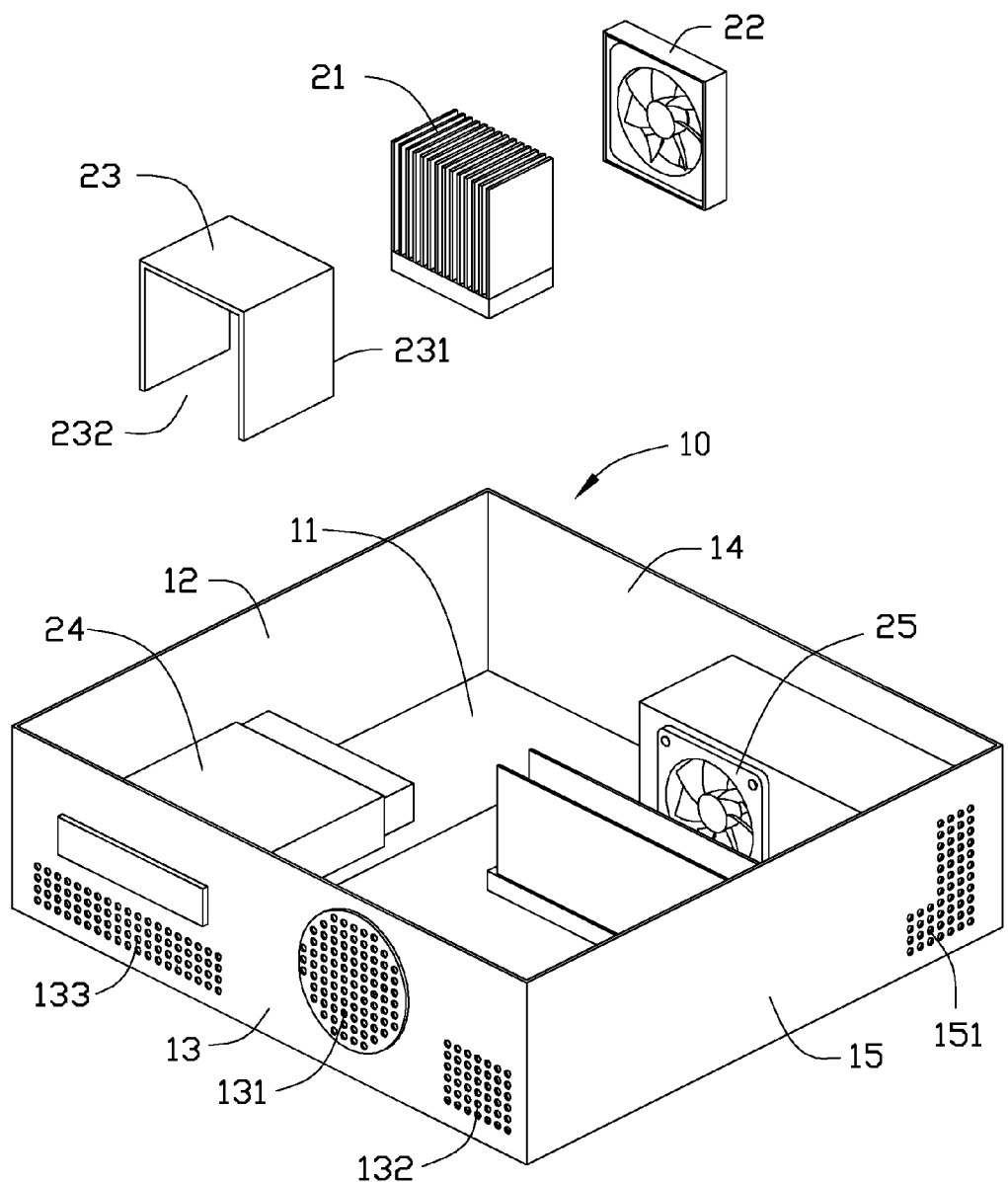
FIG. 1 is an exploded view of a heat dissipation system, in accordance with an embodiment.
Figure 2:
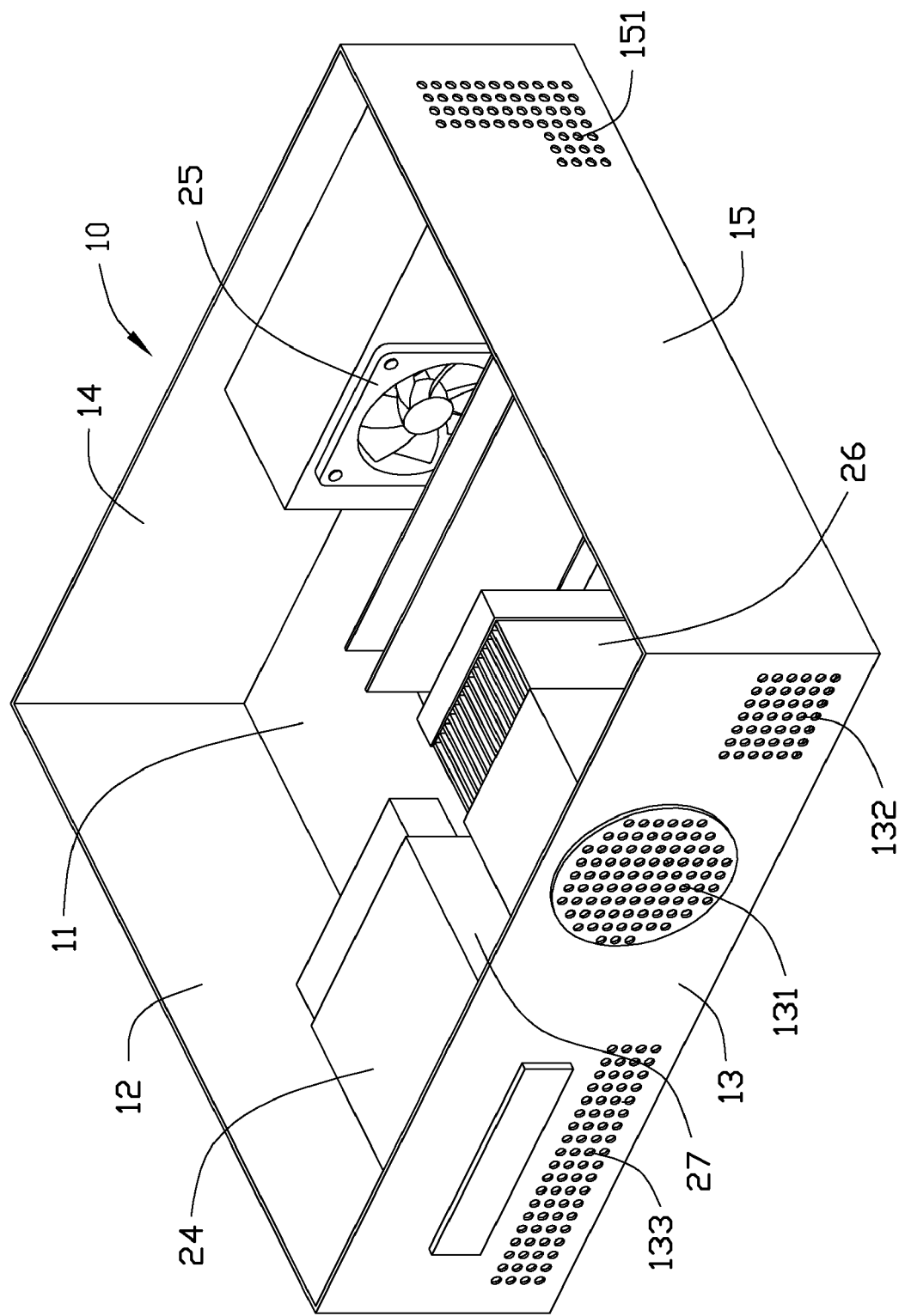
FIG. 2 is an assembled view of the heat dissipation system shown in FIG. 1.

Referring to FIGS. 1 and 2, a heat dissipation system for a computer case 10 includes a base plate 11, a front plate 12, a first side plate 13, a second side plate 14 and a back plate 15. The base plate 11 has a motherboard (not labeled) attached. The motherboard is installed with a first heat source (not shown). A heat sink 21 is positioned on the first heat source adjacent to the back plate 15. A first fan 22 is positioned on the motherboard adjacent to a first side of the heat sink 21. An air duct 23 is positioned on the motherboard adjacent to a second side of the heat sink 21. The heat sink 21 is capable of heating air blown from first fan 22 through the heat sink 21 and the air duct 23. The first side plate 13 defines a first air outlet 131 adjacent to the air duct 23. The air duct 23 defines an air inlet opening 231 and an air outlet opening 232. The air inlet opening 231 is adjacent with the second side of the heat sink 21. The air outlet opening 232 and the first air outlet 131 communicate with each other. The air inlet opening 231 and air outlet opening 232 can be rectangular.

A first side plate 13 is adjacent to the first air outlet 131. The first heat source and the back plate 15 define a first air channel 26 therebetween. The first air inlet 132 is in communication with the first air channel 26. The base plate 11 is installed with a second heat source 24 adjacent to the motherboard. The first heat source and the second heat source 24 define a second air channel 27 therebetween. The second air channel 27 is parallel to the first air channel 26. The first side plate 13 defines a second air inlet 133 adjacent to the first air outlet 131. The second air inlet 133 is in communication with the second air channel 27. A second fan 25 is positioned on the base plate 11 adjacent to the second side plate 14. The back plate 15 defines a second air outlet 151 adjacent to the second fan 25.

In use, the motherboard is powered on, the first fan 22 and the second fan 25 are rotating. The cool air outside the computer case 10 is sucked into the computer case 10 by the first fan 22 via the first air inlet 132 and the first air channel 26 correspondingly.

A speed of the cool airflow is accelerated when passing through the first fan 22. The cool air displaces the warm air heated by the heat sink 21. The warm air is blown out of the computer case 10 by the first fan 22 via the air duct 23 and the first air outlet 131 correspondingly. At the same time, the cool air outside the computer case 10 is sucked into the computer case 10 by the first fan 22 via the second air inlet 133 and the second air channel 27 correspondingly. The cool air displaces the warm air heated by the second heat source 24. The warm air is blown out of the computer case 10 by the second fan 25 via the second air outlet 151. The warm air heated by the heat sink 21, and the second heat source 24 can be propelled out of the computer case 10 via separated air channels and air outlets correspondingly. Therefore, reflection and interference of airflow in the computer case 10 can be avoided.

Using a software application called Icepak to simulate the efficiency of the heat dissipation system, the following results shown below were obtained. The simulated conditions are set to: initial ambient temperature 35 degrees Celsius. A power dissipation of the first heat source is 95 W. A power dissipation of the second heat source 24 is 20 W. The heat sink 21 has a dimension of 85.3 millimeter (mm)×81 mm×87.7 mm (length×width×height). The first and second fans 22, 25 have a dimension of 92 mm×92 mm×25 mm (length×width×height). A maximum air flow rate of the fans 22, 25 is 35.32 cubic feet per minute (cfm). A rated speed of the fans 22, 25 is 2000 revolutions per minute (rpm). The simulation according to the set conditions shows that the maximum temperature in the computer case 10 is 74.084 degrees Celsius when the heat dissipation system of the disclosure, and 77.251 degrees Celsius when using a common heat dissipation system. The first heat source is a CPU, the second heat source 24 is a hard disc.

Figure 3:
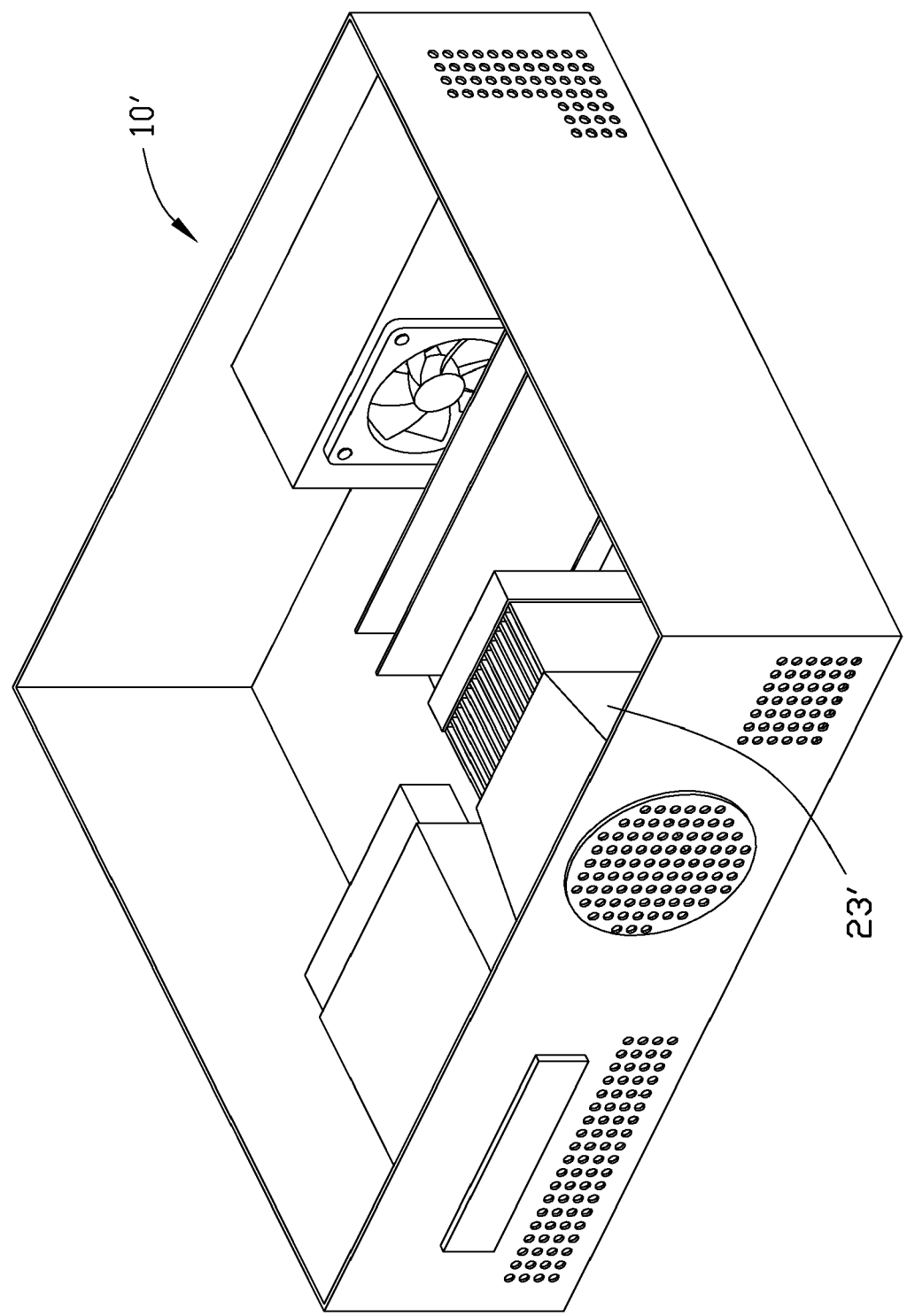
FIG. 3 is an isometric view of a heat dissipation system, in accordance with another embodiment.

Referring to FIG. 3, in another embodiment of the heat dissipation system, the air duct 23' has a shape facilitating the warm air been propelled out of the computer case 10. A size of the air outlet opening (not labeled) is greater than that of the air inlet opening (not labeled).

It is to be understood, however, that even though numerous characteristics and advantages of the embodiments have been set forth in the foregoing description, together with details of the structure and function of the embodiments, the disclosure is illustrative only, and changes may be made in detail, especially in matters of shape, size, and arrangement of parts within the principles of the disclosure to the full extent indicated by the broad general meaning of the terms in which the appended claims are expressed.

What is claimed is:

1. A heat dissipation system comprising:
   a computer case comprising a base plate and a back plate and a first side plate perpendicular to the base plate;

wherein the first side plate defines a first air inlet therein and a first air outlet adjacent to the first air inlet;

a heat sink positioned on a first heat source attached to the base plate; a first air channel is defined between the first heat source and the back plate; wherein the first air channel is in communication with the first air inlet;

a first fan positioned in the computer case adjacent to a first side of the heat sink, the first fan is configured to generate airflow through the heat sink in such a manner that airflow flows from the computer case outside is sucked into the computer case via the first air inlet and the first air channel; and an air duct positioned in the computer case adjacent to a second side of the heat sink; wherein the heat sink is capable of heating air flowing from the first fan; the airflow heated by the heat sink is then blown out of the computer case by the first fan via the air duct and the first air outlet;

a second heat source positioned on the base plate and a second air channel is defined between the first heat source and the second heat source; wherein the second air channel is parallel to the first air channel.

2. The heat dissipation system of claim 1, wherein the computer case further comprises a front plate; the base plate is attached to a motherboard; the first heat source is positioned on the motherboard adjacent to the back plate; the second heat source is positioned on the base plate adjacent to the front plate.

3. The heat dissipation system of claim 2, wherein the air duct includes an air inlet opening and an air outlet opening; the air inlet opening communicates with the second side of the heat sink; the air outlet opening communicates with the first air outlet.

4. The heat dissipation system of claim 3, wherein the computer case further comprises a second side plate opposite to the first side plate; a second fan is positioned on the base plate adjacent to the second side plate; a second air outlet is defined in the back plate adjacent to the second fan.

5. The heat dissipation system of claim 3, wherein a second air inlet is defined in the first side plate adjacent to the first air outlet, and the second air inlet is in communication with the second air channel.

6. The heat dissipation system of claim 1, wherein the air duct has a shape facilitating the air flow passing through, a size of the air outlet opening is greater than that of the air inlet opening.

* * * * *